(12) United States Patent
Eray

(10) Patent No.: US 7,830,324 B2
(45) Date of Patent: Nov. 9, 2010

(54) ELECTRONIC ENTITY HAVING A MAGNETIC ANTENNA

(75) Inventor: Yves Eray, Ouistreham (FR)

(73) Assignee: Oberthur Technologies, Levallois-Perret (FR)

( * ) Notice: Subject to any disclaimer, the term of this patent is extended or adjusted under 35 U.S.C. 154(b) by 0 days.

(21) Appl. No.: 11/993,879

(22) PCT Filed: Jun. 20, 2006

(86) PCT No.: PCT/FR2006/001393

§ 371 (c)(1),
(2), (4) Date: Dec. 26, 2007

(87) PCT Pub. No.: WO2007/000503

PCT Pub. Date: Jan. 4, 2007

(65) Prior Publication Data

US 2008/0211728 A1    Sep. 4, 2008

(30) Foreign Application Priority Data

Jun. 27, 2005    (FR)    .................................. 05 06521

(51) Int. Cl.
*H01Q 7/08* (2006.01)

(52) U.S. Cl. ........................ 343/788; 343/741; 343/742; 343/866; 343/867

(58) Field of Classification Search ................. 343/895, 343/788, 741, 742, 866, 867, 870
See application file for complete search history.

(56) References Cited

U.S. PATENT DOCUMENTS

| | | | |
|---|---|---|---|
| 5,608,417 A | * | 3/1997 | de Vall ........................ 343/895 |
| 6,285,342 B1 | | 9/2001 | Brady et al. |
| 6,600,420 B2 | * | 7/2003 | Goff et al. ................. 340/572.4 |
| 7,102,520 B2 | * | 9/2006 | Liu et al. .................. 340/572.1 |
| 7,119,743 B2 | | 10/2006 | Iguchi et al. |
| 7,224,280 B2 | * | 5/2007 | Ferguson et al. ......... 340/572.7 |
| 2003/0019941 A1 | | 1/2003 | Altwasser |
| 2006/0050008 A1 | | 3/2006 | Morand et al. |

FOREIGN PATENT DOCUMENTS

| | | |
|---|---|---|
| DE | 196 10 284 A1 | 8/1997 |
| EP | 149240 | 7/1985 |
| EP | 886239 | 12/1998 |
| EP | 1 538 703 A1 | 8/2005 |
| FR | 2724263 | 3/1996 |
| FR | 2769390 | 4/1999 |
| FR | 2812482 | 2/2002 |
| FR | 2 815 176 A | 4/2002 |
| FR | 2815176 | 4/2002 |
| WO | 9808190 | 2/1998 |
| WO | 2004/109852 A1 | 12/2004 |

\* cited by examiner

*Primary Examiner*—Hoang V Nguyen
(74) *Attorney, Agent, or Firm*—Young & Thompson

(57) ABSTRACT

An electronic entity includes an electronic circuit (21) having at least one first terminal (22) and a second terminal (24) to which an antenna is connected. The antenna includes a conducting element (26) electrically connected to the first terminal (22) of the electronic circuit (21) and includes a resonator (28) insulated from the conducting element (26) at the antenna, electrically connected to the second terminal (24) of the electronic circuit (21) and coupled to the conducting element (26).

37 Claims, 4 Drawing Sheets

ELECTRONIC ENTITY HAVING A MAGNETIC ANTENNA

BACKGROUND OF THE INVENTION

1. Field of the Invention

The invention concerns an electronic entity with a magnetic antenna.

2. Description of the Related Art

Electronic entities of this type generally comprise an electronic circuit having in particular two terminals to which is connected a magnetic antenna generally formed of a winding of several turns produced in conductive material.

This type of electronic entity includes in particular contactless microcircuit cards (where the magnetic antenna constitutes the only means of communication of the microcircuit with the exterior) and so-called "dual" or "hybrid" microcircuit cards (where electrical contacts are provided on one face of the card that provide an alternative mode of communication of the microcircuit with the exterior). In microcircuit cards of either type, the turns of the magnetic antenna are generally produced in the form of windings of copper wire or conductive tracks, in both cases disposed within the layers physically constituting the card.

It can also be a question of an electronic entity of the electronic passport type that comprises in one of its pages means (in particular microcircuit and antenna means) able to communicate without contact with an external device of the reader type.

In all cases, to increase the induced current that the magnetic antenna delivers to the electronic circuit, the designer of the electronic entity is constrained to increase the number of turns in order to increase the magnetic flux through the antenna.

Increasing the number of turns rapidly leads to problems, however: on the one hand, the increase of the area that carries the turns relative to the available area can cause problems of congestion, all the more so in that the geometry of the turns is relatively fixed, which is a particular nuisance in the case of electronic entities with small dimensions; on the other hand, the small number of areas generally available to receive the turns (often deposited in the same plane, for example) make bridging techniques necessary for the looping of the electrical circuit, as described for example in patent application FR 2 769 390.

SUMMARY OF THE INVENTION

The invention aims to limit these problems and therefore to propose an electronic entity with a magnetic antenna the design of which facilitates integration of the antenna into the electronic entity, for example through greater freedom in its design and a reduction in its area, without compromising its performance.

The invention therefore proposes an electronic entity comprising an electronic circuit having at least a first terminal and a second terminal to which an antenna is connected, characterized in that the antenna comprises a conductive member electrically connected to the first terminal of the electronic circuit and a resonator isolated from the conductive member at the level of the antenna, electrically connected to the second terminal of the electronic circuit, and coupled to the conductive member. The resonator has a Q producing amplification at the communication frequency of the electronic circuit.

The introduction of the resonator coupled to the conductive member on the one hand amplifies the electrical signals received by the antenna from the reader (or other external device) and on the other hand makes designing the antenna more flexible.

For example, the resonator is capacitively coupled to the conductive member, for particularly beneficial operation of the antenna, as explained hereinafter.

To this end, the resonator comprises a turn facing the conductive member over at least a portion of its perimeter, for example.

To maximize the capacitive coupling, the turn faces the conductive member over virtually all of its perimeter and/or the turn and the conductive members are situated at a distance less than 0.5 mm over said perimeter portion.

In one practical embodiment, the conductive member is formed by a turn portion, i.e. by a winding that extends over one turn (360°) at most. This is made possible by the use of the resonator, which enables the number of turns of the conductive member to be drastically reduced. The area necessary for implanting the conductive member is therefore very small, which is beneficial in particular in the case where the conductive member and the resonator are coplanar.

In the same line of thinking, and because of the limited extent of the conductive member, the capacitance of the conductive member can be negligible compared to the capacitance of the resonator and/or the inductance of the conductive member can be negligible compared to the inductance of the resonator. Similarly, the capacitance of the conductive member can be negligible compared to the coupling capacitance.

Here negligible means less than around 10%.

In one possible embodiment, the resonator takes the form of a conductive winding having at least one free end, which can then comprise a plurality of turns. In this case, to obtain a particularly efficient resonator, the turns are separated two by two by a distance less than 0.5 mm.

The resonator can be connected to the second terminal by the end of the winding opposite the free end; the resonator can instead be connected to another region of the winding, in which case the conductive winding has two free ends.

In one possible embodiment, the conductive member is inside the area defined by the resonator. In another embodiment, the resonator is inside the conductive member.

In one possible embodiment, the conductive member forms a loop connected at both its ends to the first terminal of the electronic circuit.

Alternatively, the end of the conductive member opposite the first terminal of the electronic circuit is free.

The conductive member and the resonator can be deposited on a common plane support.

According to one possible embodiment, shown in the appended drawings in particular, the projection of the circuit formed by the antenna and the electronic circuit in a plane that is substantially parallel to that projection forms a line with no intersections and the antenna comprises a winding that extends over strictly more than one turn. This produces an antenna of good efficiency, which can be plane or essentially plane, without necessitating the presence of an antenna circuit looping bridge.

Alternatively, the conductive member is produced in a first plane, the resonator is produced in a second plane different from the first plane, and the resonator is in line with the conductive member, for example a median turn of the resonator is in line with the conductive member to obtain particularly efficient coupling.

The resonant frequency of the resonator alone (or no-load resonator frequency) is for example not more than 10% greater than a communication frequency of the electronic circuit with external electronic devices (for example a contactless reader). Thus the coupling of the conductive member implying a resonant frequency of the circuit as a whole slightly lower than the resonant frequency of the resonator alone, the resonant frequency of the circuit as a whole is particularly suitable for obtaining the benefit of the amplification phenomenon.

The antenna considered here is a magnetic antenna, i.e. an antenna that essentially generates an induction current.

For example, the electronic circuit operates at a communication frequency below 100 MHz.

Said communication frequency can for instance be from 1 MHz to 50 MHz, in particular from 13 MHz to 15 MHz.

In the latter case, the resonant frequency of the resonator alone can then advantageously be from 13.6 MHz to 17 MHz.

The external dimensions of the electronic entity are less than 100 mm, for example, or even less than 30 mm. In this case the resonator is particularly beneficial when the available area is small.

The resonator can then advantageously comprise more than ten turns.

The electronic entity can therefore be a pocket electronic entity, for example a microcircuit card. In this case, the antenna can advantageously extend over only around half the area of the card.

The electronic entity is an electronic identity document, for example, such as an electronic passport.

BRIEF DESCRIPTION OF THE DRAWING FIGURES

Other features and advantages of the invention will become apparent in the light of the following description, given with reference to the appended drawings, in which.

DETAILED DESCRIPTION OF THE INVENTION

Figure 1:
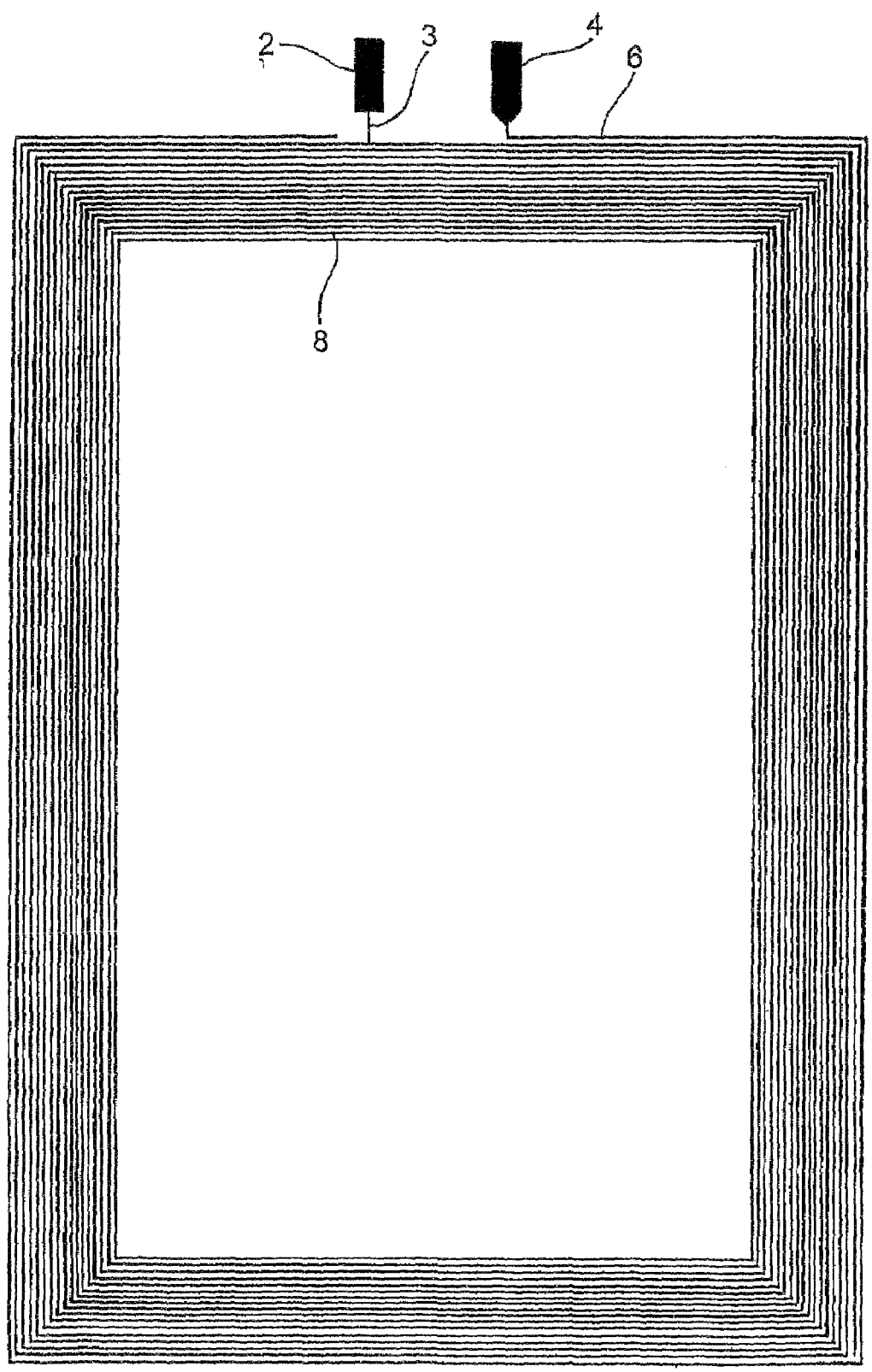
FIG. 1 represents a first example of a magnetic antenna for an electronic entity according to the teachings of the invention.

FIG. 1 represents an antenna for an electronic entity, for example a microcircuit card.

The FIG. 1 antenna comprises a first connecting land 2 and a second connecting land 4, each intended to be electrically connected to one terminal of an electronic circuit of the electronic entity. This kind of electronic circuit is generally a microcircuit that has two dedicated terminals for the connection to an antenna.

The magnetic antenna from FIG. 1 on the one hand provides a remote power feed to the electronic circuit and on the other hand receives coded information, for example on a 13.56 MHz carrier. It also enables the electronic circuit to communicate with an external device (for example a reader) by back-modulation of the signal received from the external device.

The antenna comprises a resonator 8 formed by the spiral winding with free ends of a plurality of conductive tracks (here from 15 to 20 turns), here situated in the same plan, for example by depositing copper tracks on a dielectric medium support.

The resonator 8 is electrically connected to the first connecting land 2 by means of a conductive track portion 3. Here the conductive portion 3 is in contact with the external turn (i.e. the outermost turn) of the resonator 8 at a distance from the end thereof, in other words, the external turn extends in two directions from the conductive portion 3.

The antenna also comprises a conductive member 6 formed of five rectilinear track portions that constitute an almost complete rectangular loop electrically connected to the second connecting land 4. The conductive member 6 extends over at least a portion of the periphery of the resonator 8 at a small distance therefrom, here over virtually the whole of that periphery, at a small distance from a turn of the resonator 8 (here the external turn).

In the example represented in FIG. 1, the conductive member 6 is situated outside the resonator 8. Alternatively, the conductive member 6 could be inside the resonator 8.

In the example represented in FIG. 1, the conductive tracks that form the resonator 8 and those that form the conductive member 6 are, as already indicated with respect to the resonator 8, provided by copper tracks approximately 0.15 mm wide (for example from 0.12 mm to 0.2 mm wide) with a spacing of approximately 0.15 mm (for example from 0.12 mm to 0.2 mm).

The small distance between the conductive member 6 and the resonator 8 over at a least a portion of the periphery of the latter produces capacitive coupling between these two elements and therefore transmission of signals between these two elements. The capacitive coupling loops the antenna circuit between the terminals of the electronic circuit, so that the antenna functions essentially magnetically.

The disposition of the resonator 8 in the form of turns generates an inductive effect, while the proximity of the portions (here rectilinear portions) of the spiral two by two and the absence of looping (because of the free ends of the spiral) induce a capacitive effect.

The resonator could instead be formed by a simple conductive track having the general shape of a loop and electrically connected (for example at both ends) to a capacitor (i.e. a discrete component here) that produces the capacitive effect (instead of the interturn capacitance mentioned above).

The resonator therefore has a high Q at a resonant frequency.

This Q at resonance will advantageously be used to amplify the signals to which the resonator is subjected at the communication frequency used. To this end, the resonator 8 is designed (by way of the disposition of its tracks, their width and the spacing between them, and the materials used for the resonator 8 and the support) to obtain inductive and capacitive effects that cause resonance at a frequency close to the communication frequency of the electronic circuit (for example slightly higher than that frequency).

For the calculation of the values of inductance and capacitance generated for given characteristics of the resonator, see for example the documents "Inductance Calculation Techniques, part II: Calculations and Handbook Methods", by Marc T. Thompson, in Power Control and Intelligent Motion, December 1999, "Design and Optimization of a 10 nH Square-Spiral Inductor for Si RF ICs", by Tuan Huu Bui, University of North Carolina, October 1999, "Capacity Limits and Matching Properties of Integrated Capacitors", by Robert Aparicio and Ali Hajimiri, in IEEE Journal of Solid State Circuits, Vol. 37 No. 3, March 2002, "Interdigital sensors and transducers" by Alexander V. Mamishev et al., in Proceedings of the IEEE, Vol. 92, No. 5, May 2004 and "Be Careful of Self and Mutual Inductance Formulae", by H. Kim and C. C-P. Chen, University of Wisconsin, Madison, 2001.

The use of a plurality of turns in the resonator, as is the case in the embodiment of the invention shown in FIG. 1, not only increases the inductive effect by increasing the length of the conductor used, but also the capacitive effect through the cooperation of each rectilinear portion of the resonator 8 with another rectilinear portion of the latter.

Note that the use of the resonator, and the resulting amplification of the signal, here limit the conductive member 6 to less than one turn (i.e. a winding that extends over strictly less than one turn, or strictly less than 360°, relative to the second connecting land 4 in the case of FIG. 1), which is advantageous in terms of congestion in particular. Note that, in this particular case, the capacitance of the conductive member is negligible compared to the capacitance of the resonator and to the coupling capacitance (because of the absence of interturn capacitance for the conductive member), and the inductance of the conductive member is negligible compared to the inductance of the resonator (because of the short length of the conductive track forming the conductive member).

Moreover, as for the conductive member 6, there are numerous possibilities for implementation of the resonator 8 other than the conductive material tracks, for example the use of a copper wire (between 0.088 mm and 0.15 mm wide and with a spacing between 0.112 mm and 0.2 mm) or the deposition of a conductive ink (between 0.15 mm and 0.3 mm wide and with a spacing between 0.3 mm and 0.5 mm).

Finally, although rectilinear portions are imposed on the resonator specified by way of example hereinabove, clearly curved portions could be used instead.

Note that for portable pocket electronic entities of ordinary size (i.e. of the order of 10 cm or less), that exchange information over a range of the order of one meter, or even a few meters, an antenna as described above operates through a magnetic field (i.e. at a distance at most of the order of the wavelength) up to frequencies of the order of 100 MHz (at which the wavelength is 3 m).

Figure 2:
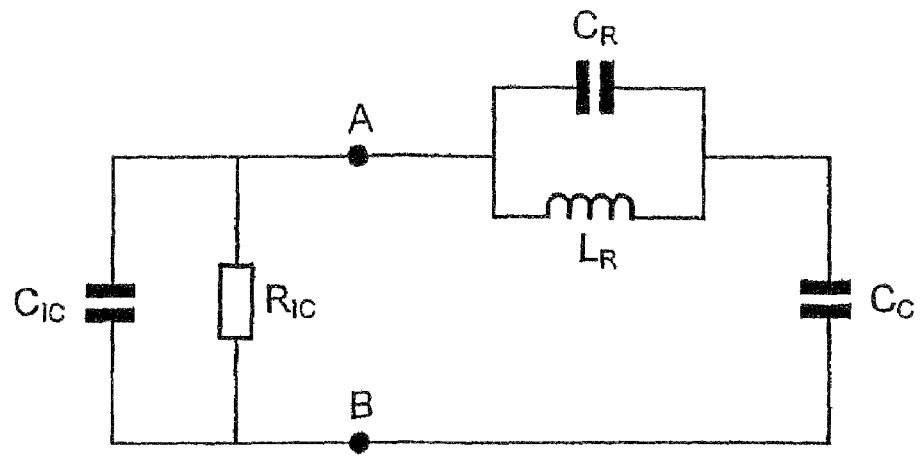
FIG. 2 represents an equivalent electronic circuit for modeling the general principles of the electrical behavior of an electronic entity comprising an antenna as shown in FIG. 1.

There is represented in FIG. 2 one possible equivalent electric circuit diagram for modeling the general principles of the electrical behavior of the electronic entity from FIG. 1, which clearly explains the electrical operation of the latter.

The electronic circuit is represented in the standard way by a resistor $R_{IC}$ and a capacitor $C_{IC}$ in parallel. In the case where the electronic circuit is an integrated circuit, this data is generally supplied by the fabricator of the electronic circuit, or can be measured.

The resonator 8 is represented by the parallel connection of a capacitor $C_R$ and an inductor $L_R$. These values are naturally such that the resonator has a resonant frequency of the order of the telecommunication frequency used by the electronic circuit, i.e. 13.56 MHz in the example shown.

The parallel circuit $C_R$-$L_R$ is electrically connected to the connecting land 22, which is represented in FIG. 2 by the point A and is electrically connected to one of the antenna terminals of the electronic circuit.

The capacitive coupling between the resonator 8 and the conductive member 6 (here represented by a simple wire) is modeled in FIG. 2 by a capacitor $C_C$ (which has a value of about 0.5 pF in the example described above). The capacitor $C_C$ is therefore naturally situated between the resonator $C_R$-$L_R$ and the second connecting land 4, represented in FIG. 2 by the point B and electrically connected to the second antenna terminal of the electronic circuit.

Figure 3:
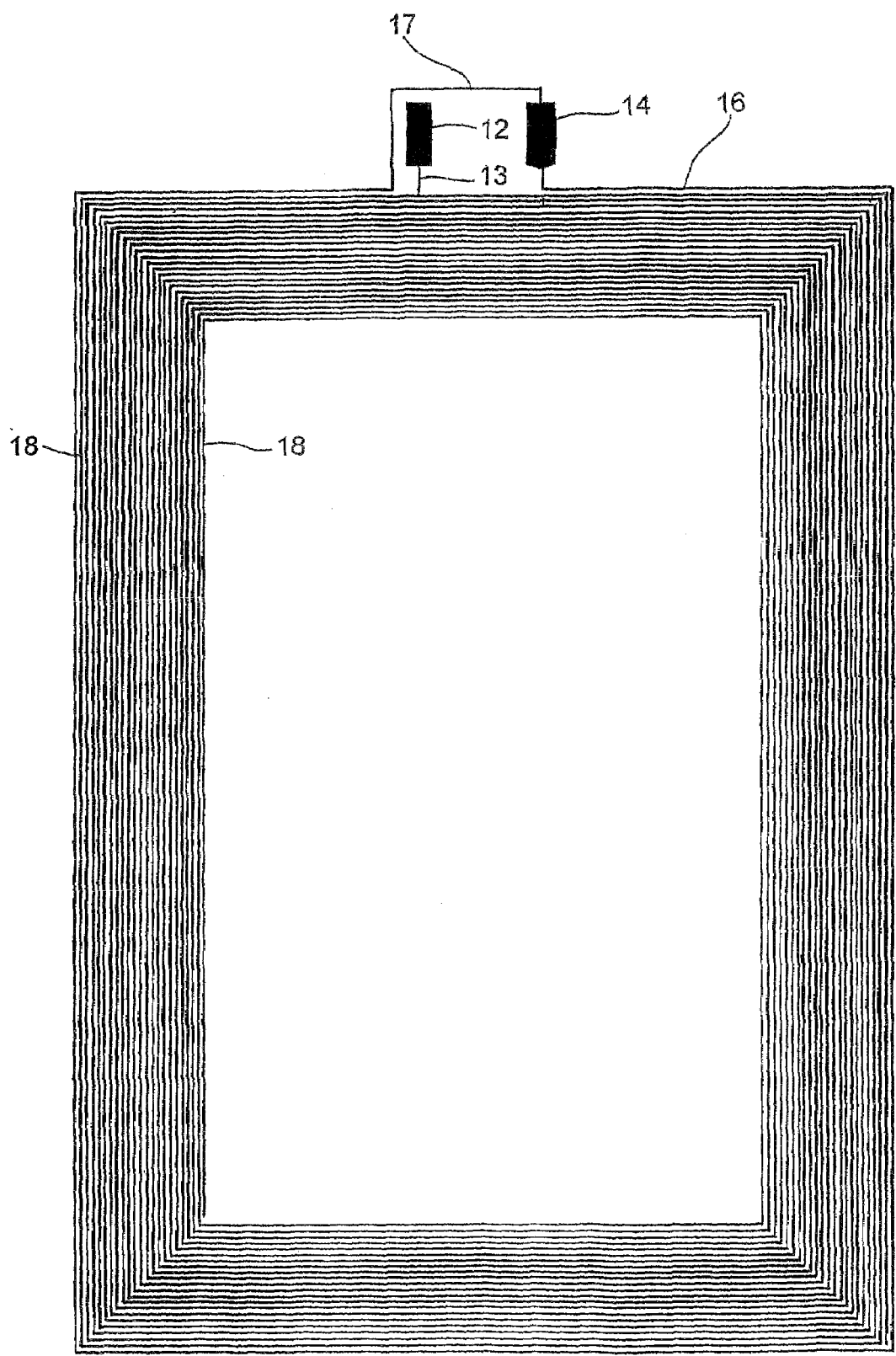
FIG. 3 represents a second example of a magnetic antenna for an electronic entity according to the teachings of the invention.

FIG. 3 represents a second embodiment of an antenna for an electronic entity such as a microcircuit card, for example.

Like the antenna represented in FIG. 1, this antenna includes a first connecting land 12 connected by means of a conductive portion 13 to a resonator 18 consisting of the spiral winding of rectilinear portions of conductive tracks produced by depositing copper on a dielectric material support, for example.

The resonator 18 is formed of a plurality of turns (here between around 15 and around 20 turns) having a width and a spacing as already indicated with reference to FIG. 1.

The antenna represented in FIG. 3 also includes a second connecting land 14 from which a conductive member 16 extends over all of the periphery of the resonator 18 and at a small distance from the external turn thereof. The conductive member 16 is extended in a looping portion 17 that provides a second electrical connection with the second connecting land 14 so that the conductive member forms a loop both ends of which are connected to the same connecting land (here the second connecting land 14).

In the example represented in FIG. 3, the looping portion 17 is situated in the same plane as the resonator 18 and circumvents the first connecting land 12 so that, over this looping portion 17 in particular, the conductive member 16 extends at a significant distance from the external turn of the resonator 18. Other solutions could naturally be envisaged for looping the conductive member 16 to the second connecting land 14, for example straddling the conductive portion 13 by means of a bridge, which would also enable the conductive member 16 to extend if necessary at a small distance from the external turn of the resonator 18 over virtually all of the periphery of the latter.

Figure 4:
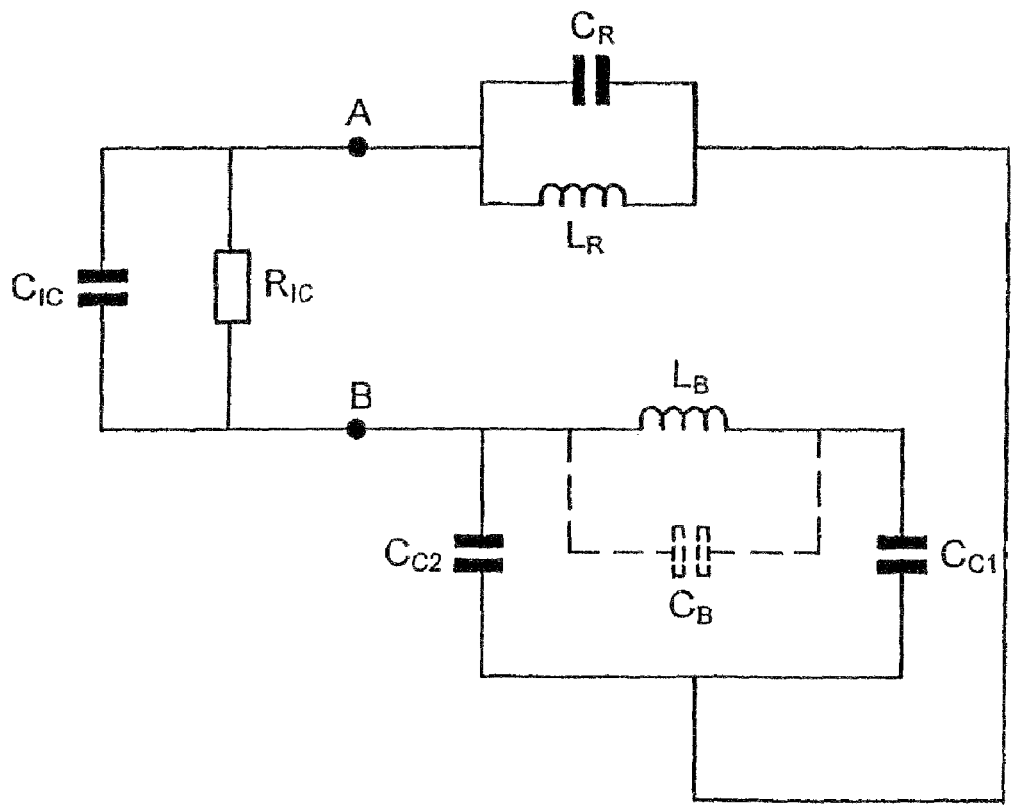
FIG. 4 represents an equivalent electronic circuit for modeling the general principles of the electrical behavior of an electronic entity comprising an antenna as shown in FIG. 3.

As for the first embodiment, the small distance between the conductive member 16 electrically connected to the second connecting land 14 and the resonator 18 electrically connected to the first connecting land 12 provides sufficient capacitive coupling between these two elements for the antenna to function when it is connected by means of these two connecting lands 12, 14 to the electronic circuit of the electrical entity, according to the equivalent circuit diagram represented in FIG. 4.

As in FIG. 2, the electronic circuit of the electronic entity is represented by the parallel connection of a resistor $R_{IC}$ and a capacitor $C_{IC}$, in electrical contact with the first connecting land and the second connecting land respectively represented by the points A and B.

The resonator 18 is again represented by the parallel connection of an inductor $L_R$ and a capacitor $C_R$, this combination being connected at one end to the first connecting land (point A).

The conductive member 16, which here forms a loop connected at both ends to the second connecting land (point B) is therefore represented here by an inductor $L_B$, possibly with a capacitor $C_B$ (represented in dashed line in FIG. 4) connected in parallel with it to represent the interturn capacitance in the conductive member 16 if the latter were formed of a plurality of turns.

In this latter case where the conductor member comprises a plurality of turns, a bridge can be used to loop the conductor element to the second connecting land 14.

The capacitive coupling between the resonator 18 and the conductive member 16 is represented by two capacitors $C_{C1}$ and $C_{C2}$ each connected between the resonator and one end of the inductor $L_B$ representing the conductive member 16, to model the fact that the capacitive coupling is distributed over all of the periphery of the loop 16.

Figure 5:
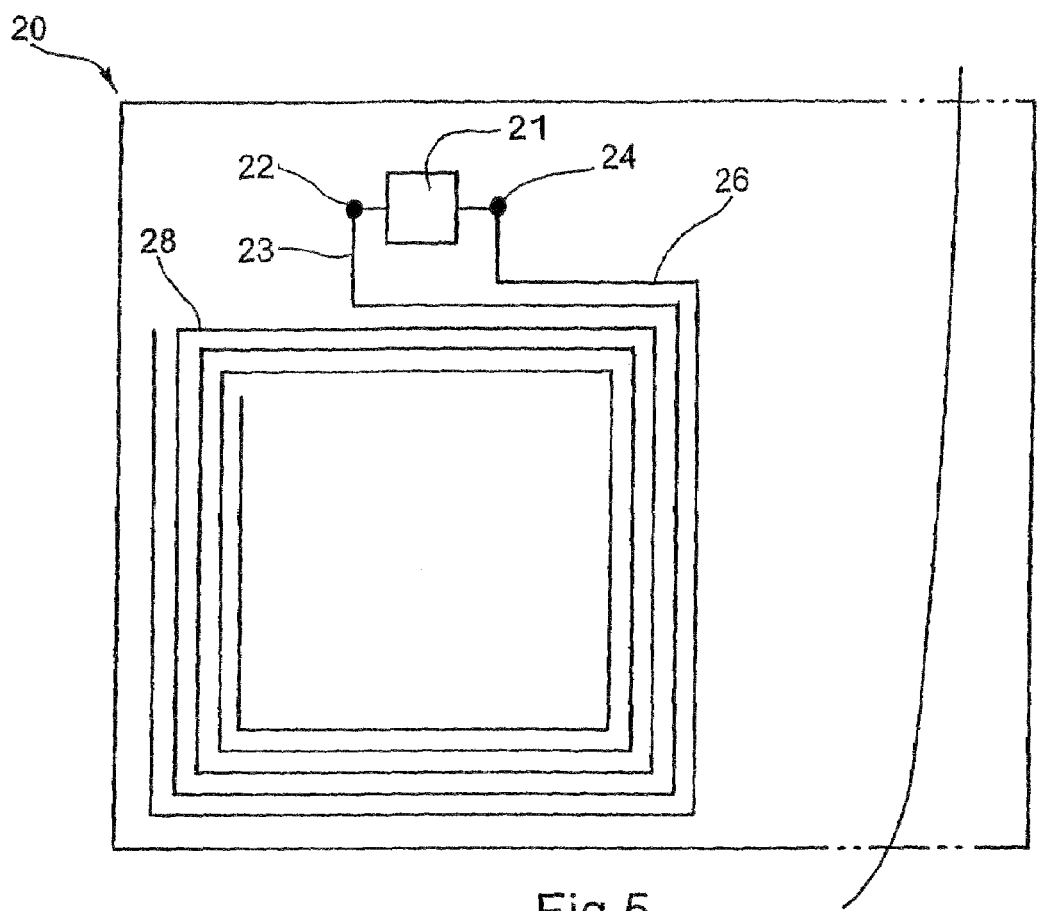
FIG. 5 represents an electronic entity conforming to a third embodiment of the invention.

FIG. 5 represents an electronic entity conforming to a third embodiment of the invention.

This electronic entity is a page 20 of an electronic passport, for example, that carries within its thickness an electronic circuit 21 electrically connected, at two dedicated terminals, to two connecting lands 22, 24 of an antenna that comprises a conductive member 26 and a resonator 28.

The electronic circuit 21 is carried by a module, for example, and its connection to the antenna by means of the lands 22, 24 can therefore be effected as described in patent application FR 2 863 747, for example.

The resonator 28 is formed by the spiral winding with one free end of a plurality of conductive tracks (rectilinear in the example shown, but which could naturally be curved), the winding of the turns and the interturn capacitances respectively producing the inductive and capacitive effects of the resonator.

The winding that constitutes the resonator 28 extends from a conductive portion 23 in one direction only, i.e. this conductive portion 23 constitutes the end opposite the free end of the winding that forms the resonator 28. Here this conductive portion 23 forms the external end of the winding; it could naturally instead be the internal end.

The conductive member 26 is electrically connected to the second connecting land 24 and for the most part extends at a small distance from the external turn of the resonator 28, over a major portion of the periphery thereof, which as in the previous embodiments produces capacitive coupling between the conductive member 26 and the resonator 28.

As for the previous embodiments, there is therefore looping in the antenna between the connecting lands 22, 24 (and thus between the terminals of the electronic circuit 21 dedicated to reception) by way of the capacitive coupling that has just been mentioned.

As explained in more detail with reference to the first embodiment, the dimensions of the resonator 28 are such that its resonant frequency corresponds to the required frequency of communication between the electronic circuit 21 and the external electronic entity with which it has to communicate. The Q of the resonator at the communication frequency therefore produces a good signal reception level despite the modest dimensions of the antenna. The latter can therefore extend over around half the area of the electronic entity, or less.

Note also that the conductive member 26 and the resonator 28 can each be produced with one free end, eliminating bridging problems sometimes encountered in the prior art solutions. This remark applies also to the various embodiments described above.

Figure 6:
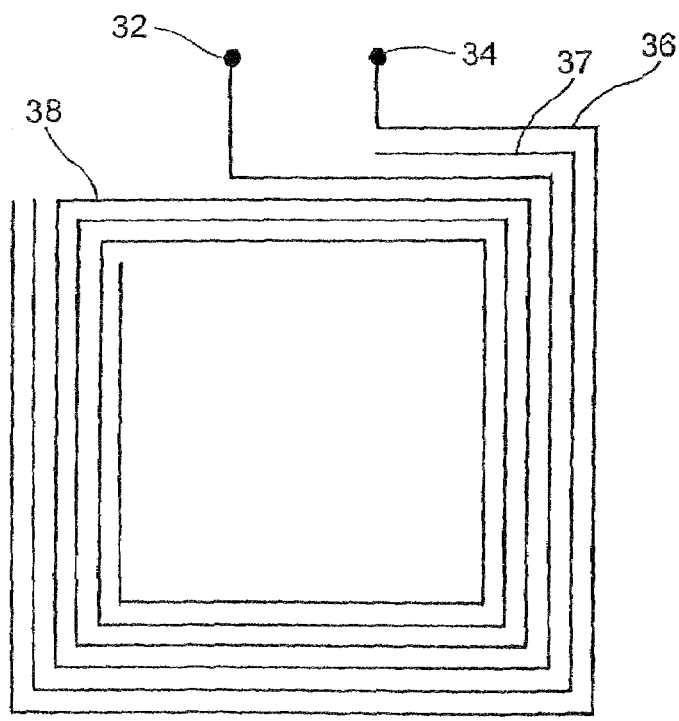
FIG. 6 represents a variant of the antenna represented in FIG. 5.

FIG. 6 represents a variant of the antenna represented in FIG. 5, which could equally be applied to the other embodiments.

In this variant, the antenna comprises an intermediate conductive track 37 disposed between a conductive member 36 and a resonator 38. The resonator 38 and the conductive member 36, which respectively extend from a first connecting land 32 and a second connecting land 34, are similar to those described with reference to the previous embodiment, apart from the fact that they are situated at a slightly greater distance because of the introduction of the intermediate conductive track 37.

The coupling between the conductive member 36 and the resonator 38 is therefore provided by way of the intermediate conductive track 37, i.e. firstly by capacitive coupling between the conductive member 36 and the intermediate conductive track 37 and secondly by capacitive coupling between the intermediate conductive track 37 and the resonator 38.

The embodiments described above represent only examples of possible implementations of the invention, which is not limited to them.

The invention claimed is:

1. An electronic entity comprising:
an electronic circuit having at least a first terminal and a second terminal to which a magnetic antenna is connected,
wherein the antenna comprises a conductive member (6; 16; 26; 36) electrically connected to the first terminal of the electronic circuit and a resonator (8; 18; 28; 38) having a Q enabling amplification at the communication frequency of the electronic circuit, isolated from the conductive member (6; 16; 26; 36) at the level of the antenna, electrically connected to the second terminal of the electronic circuit, and coupled to the conductive member (6; 16; 26; 36).

2. The electronic entity according to claim 1, wherein the resonator (8; 18; 28; 38) is capacitively coupled to the conductive member (6; 16; 26; 36).

3. The electronic entity according to claim 2, wherein the capacitance of the conductive member is negligible compared to the coupling capacitance ($C_c$).

4. The electronic entity according to claim 2, wherein the resonator (8; 18; 28) comprises a turn facing the conductive member (6; 16; 26) over at least a portion of its perimeter.

5. The electronic entity according to claim 4, wherein the turn faces the conductive member (6; 16; 26) over virtually all of its perimeter.

6. The electronic entity according to claim 4, wherein the turn and the conductive member (6; 16; 26) are situated at a distance less than 0.5 mm over said perimeter portion.

7. The electronic entity according to claim 1, wherein the conductive member is formed by a turn portion.

8. The electronic entity according to claim 1, wherein the capacitance of the conductive member is negligible compared to the capacitance ($C_R$) of the resonator.

9. The electronic entity according to claim 1, wherein the inductance of the conductive member is negligible compared to the inductance ($L_R$) of the resonator.

10. The electronic entity according to claim 1, wherein the resonator (8; 18; 28; 38) takes the form of a conductive winding having at least one free end.

11. The electronic entity according to claim 10, wherein the resonator (28; 38) is connected to the second terminal by the end of the winding opposite the free end.

12. The electronic entity according to claim 10, wherein said conductive winding comprises a plurality of turns.

13. The electronic entity according to claim 12, wherein the turns are separated two by two by a distance less than 0.5 mm.

14. The electronic entity according to claim 10, wherein the conductive member is inside the area defined by the resonator.

15. The electronic entity according to claim 1, wherein the conductive member (6; 16; 26; 36) and the resonator (8; 18; 28; 38) are deposited on a common plane support.

16. The electronic entity according to claim 1, wherein the resonant frequency of the resonator alone is not more than 10% greater than a communication frequency of the electronic circuit.

17. The electronic entity according to claim 1, wherein the electronic circuit operates at a communication frequency below 100 MHz.

18. The electronic entity according to claim 17, wherein said communication frequency is from 1 MHz to 50 MHz.

19. The electronic entity according to claim 18, wherein the communication frequency is from 13 MHz to 15 MHz.

20. The electronic entity according to claim 19, wherein the resonant frequency of the resonator alone is from 13.6 MHz to 17 MHz.

21. The electronic entity according to claim 1, having overall exterior dimensions less than 100 mm.

22. The electronic entity according to claim 21, wherein the resonator (8; 18) comprises more than ten turns.

23. The electronic entity according to claim 21, wherein said exterior dimensions are less than 30 mm.

24. A pocket electronic entity according to claim 1.

25. The electronic entity according to claim 1, forming a microcircuit card.

26. The electronic entity according to claim 25, wherein the antenna extends over about half the area of the card.

27. The electronic entity according to claim 1, wherein the end of the conductive member (6; 26; 36) opposite the first terminal of the electronic circuit is free.

28. The electronic entity according to claim 1, constituting an electronic identity document.

29. An electronic entity comprising:
an electronic circuit having at least a first terminal and a second terminal to which an antenna is connected,
wherein the antenna comprises a conductive member (6; 16; 26; 36) electrically connected to the first terminal of the electronic circuit and a resonator (8; 18; 28; 38) having a Q enabling amplification at the communication frequency of the electronic circuit, isolated from the conductive member (6; 16; 26; 36) at the level of the antenna, electrically connected to the second terminal of the electronic circuit, and coupled to the conductive member (6; 16; 26; 36), and the resonator (8; 18; 28; 38) takes the form of a conductive winding having two free ends.

30. The electronic entity according to claim 29, wherein said conductive winding comprises a plurality of turns.

31. The electronic entity according to claim 30, wherein the turns are separated two by two by a distance less than 0.5 mm.

32. The electronic entity according to claim 29, wherein the conductive member is inside the area defined by the resonator.

33. An electronic entity comprising:
an electronic circuit having at least a first terminal and a second terminal to which an antenna is connected,
wherein the antenna comprises a conductive member (6; 16; 26; 36) electrically connected to the first terminal of the electronic circuit and a resonator (8; 18; 28; 38) having a Q enabling amplification at the communication frequency of the electronic circuit, isolated from the conductive member (6; 16; 26; 36) at the level of the antenna, electrically connected to the second terminal of the electronic circuit, and coupled to the conductive member (6; 16; 26; 36), and the resonator (8; 18; 28; 38) is inside the conductive member (6; 16; 26; 36).

34. An electronic entity comprising:
an electronic circuit having at least a first terminal and a second terminal to which an antenna is connected,
wherein the antenna comprises a conductive member (6; 16; 26; 36) electrically connected to the first terminal of the electronic circuit and a resonator (8; 18; 28; 38) having a Q enabling amplification at the communication frequency of the electronic circuit, isolated from the conductive member (6; 16; 26; 36) at the level of the antenna, electrically connected to the second terminal of the electronic circuit, and coupled to the conductive member (6; 16; 26; 36), and
the projection of the circuit formed by the antenna and the electronic circuit in a plane that is substantially parallel to that projection forms a line with no intersections and wherein the antenna comprises a winding (8; 18; 28; 38) that extends over strictly more than one turn.

35. An electronic entity comprising:
an electronic circuit having at least a first terminal and a second terminal to which an antenna is connected,
wherein the antenna comprises a conductive member (6; 16; 26; 36) electrically connected to the first terminal of the electronic circuit and a resonator (8; 18; 28; 38) having a Q enabling amplification at the communication frequency of the electronic circuit, isolated from the conductive member (6; 16; 26; 36) at the level of the antenna, electrically connected to the second terminal of the electronic circuit, and coupled to the conductive member (6; 16; 26; 36), and
the conductive member is produced in a first plane, the resonator is produced in a second plane different from the first plane, and the resonator is in line with the conductive member.

36. The electronic entity according to claim 35, wherein a median turn of the resonator is in line with the conductive member.

37. An electronic entity comprising:
an electronic circuit having at least a first terminal and a second terminal to which an antenna is connected,
wherein the antenna comprises a conductive member (6; 16; 26; 36) electrically connected to the first terminal of the electronic circuit and a resonator (8; 18; 28; 38) having a Q enabling amplification at the communication frequency of the electronic circuit, isolated from the conductive member (6; 16; 26; 36) at the level of the antenna, electrically connected to the second terminal of the electronic circuit, and coupled to the conductive member (6; 16; 26; 36), and the conductive member (16) forms a loop connected at both ends to the first terminal of the electronic circuit.

* * * * *